United States Patent
Tanaka et al.

(10) Patent No.: US 11,586,078 B2
(45) Date of Patent: Feb. 21, 2023

(54) LIQUID CRYSTAL DEVICE

(71) Applicant: Japan Display Inc., Tokyo (JP)

(72) Inventors: Shinichiro Tanaka, Tokyo (JP); Takeo Koito, Tokyo (JP); Kojiro Ikeda, Tokyo (JP); Koichi Nagao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/451,507

(22) Filed: Oct. 20, 2021

(65) Prior Publication Data

US 2022/0128869 A1    Apr. 28, 2022

(30) Foreign Application Priority Data

Oct. 27, 2020  (JP) .............................. JP2020-179556

(51) Int. Cl.
*G02F 1/1343* (2006.01)
*G02F 1/1347* (2006.01)

(52) U.S. Cl.
CPC ...... *G02F 1/134309* (2013.01); *G02F 1/1347* (2013.01)

(58) Field of Classification Search
CPC ............... G02F 1/1347; G02F 1/13471; G02F 1/134309
See application file for complete search history.

(56) References Cited

U.S. PATENT DOCUMENTS

| 5,777,706 A * | 7/1998 | Chen ................... G02F 1/13471 |
| | | 349/77 |
| 2010/0026920 A1* | 2/2010 | Kim ..................... H04N 13/305 |
| | | 349/33 |
| 2012/0257131 A1 | 10/2012 | Galstian et al. |
| 2016/0065950 A1* | 3/2016 | Quan .................... G02F 1/1339 |
| | | 348/51 |
| 2016/0077402 A1 | 3/2016 | Takehara et al. |

FOREIGN PATENT DOCUMENTS

| JP | 2008-076926 A | 4/2008 |
| JP | 2016-057541 A | 4/2016 |
| JP | 2013-515969 A | 5/2019 |

* cited by examiner

*Primary Examiner* — Nathanael R Briggs
(74) *Attorney, Agent, or Firm* — Maier & Maier, PLLC

(57) ABSTRACT

According to one embodiment, a liquid crystal device includes a first liquid crystal cell and a second liquid crystal cell bonded to the first liquid crystal cell. The first liquid crystal cell and the second liquid crystal cell each include a first substrate including first electrodes formed in a strip shape, a second substrate including second electrodes formed in a strip shape, and a liquid crystal layer held between the first substrate and the second substrate. An angle of intersection of the first electrodes and the second electrodes is less than 90° in each of the first liquid crystal cell and the second liquid crystal cell.

3 Claims, 10 Drawing Sheets

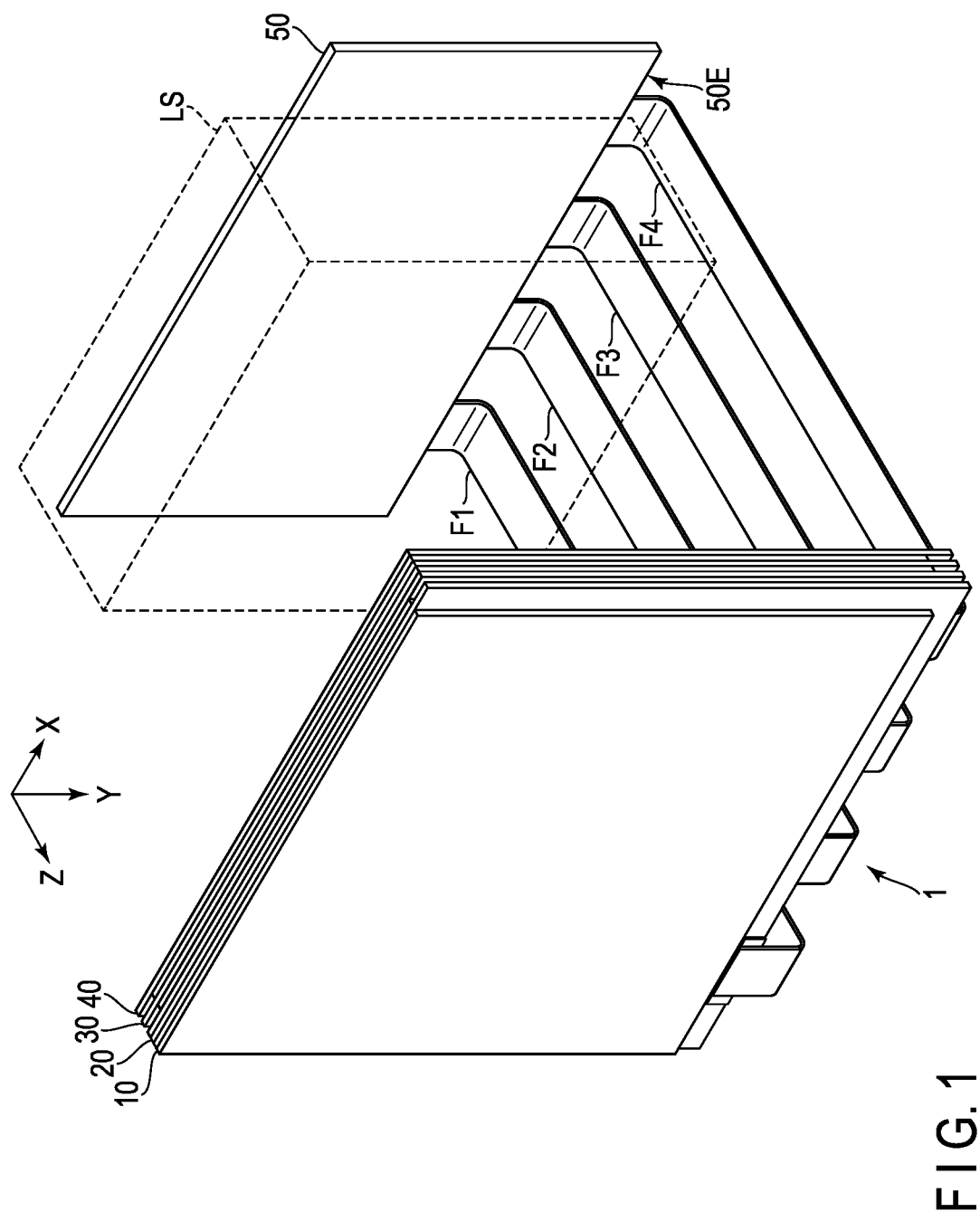
F I G. 1

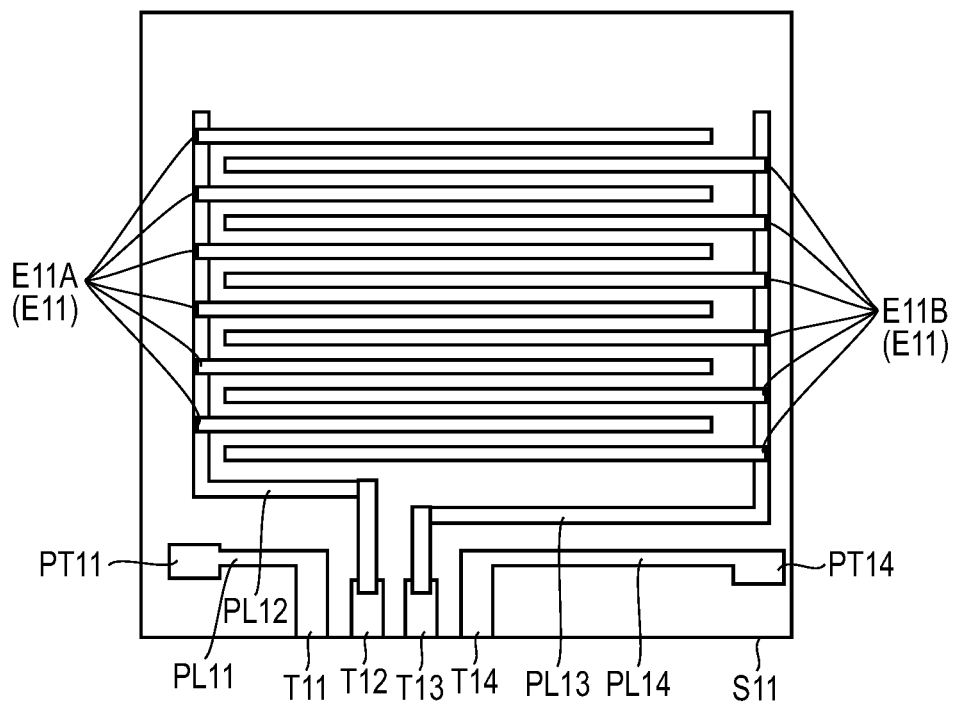
F I G. 4
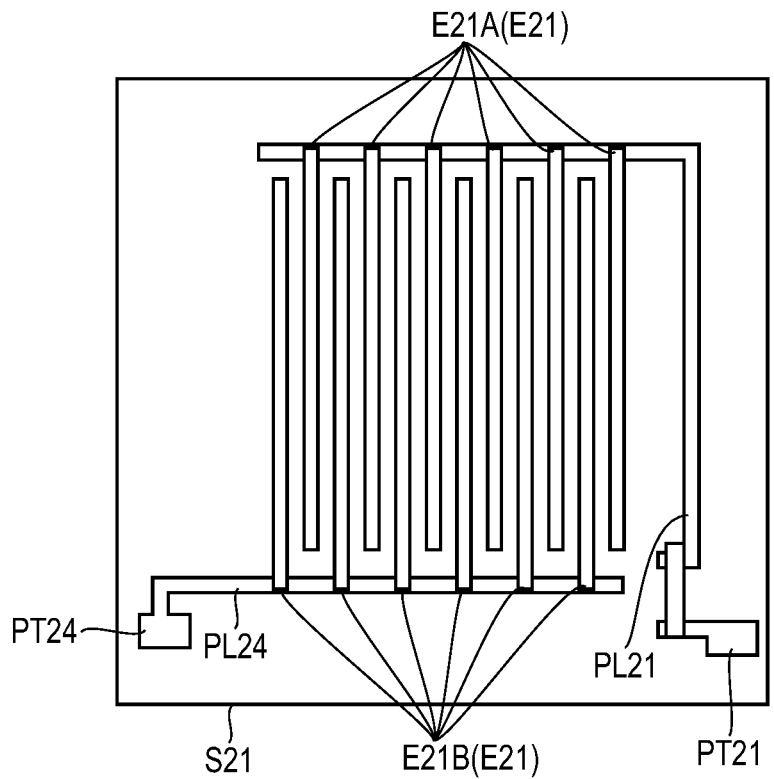
F I G. 5

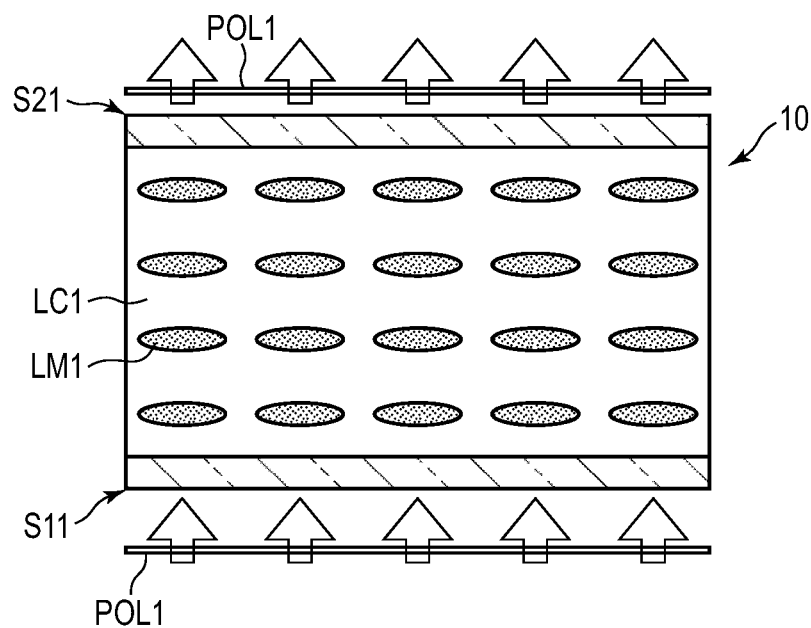
F I G. 7
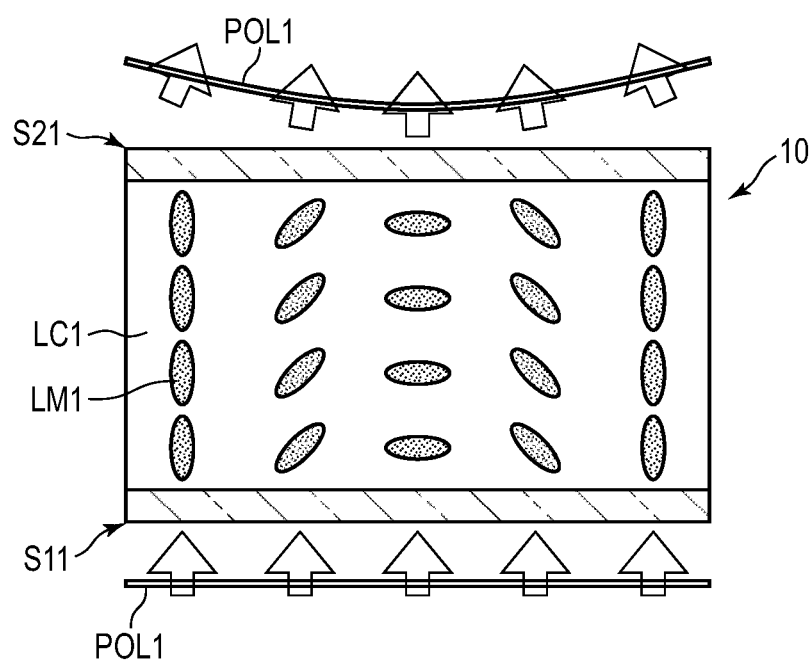
F I G. 8

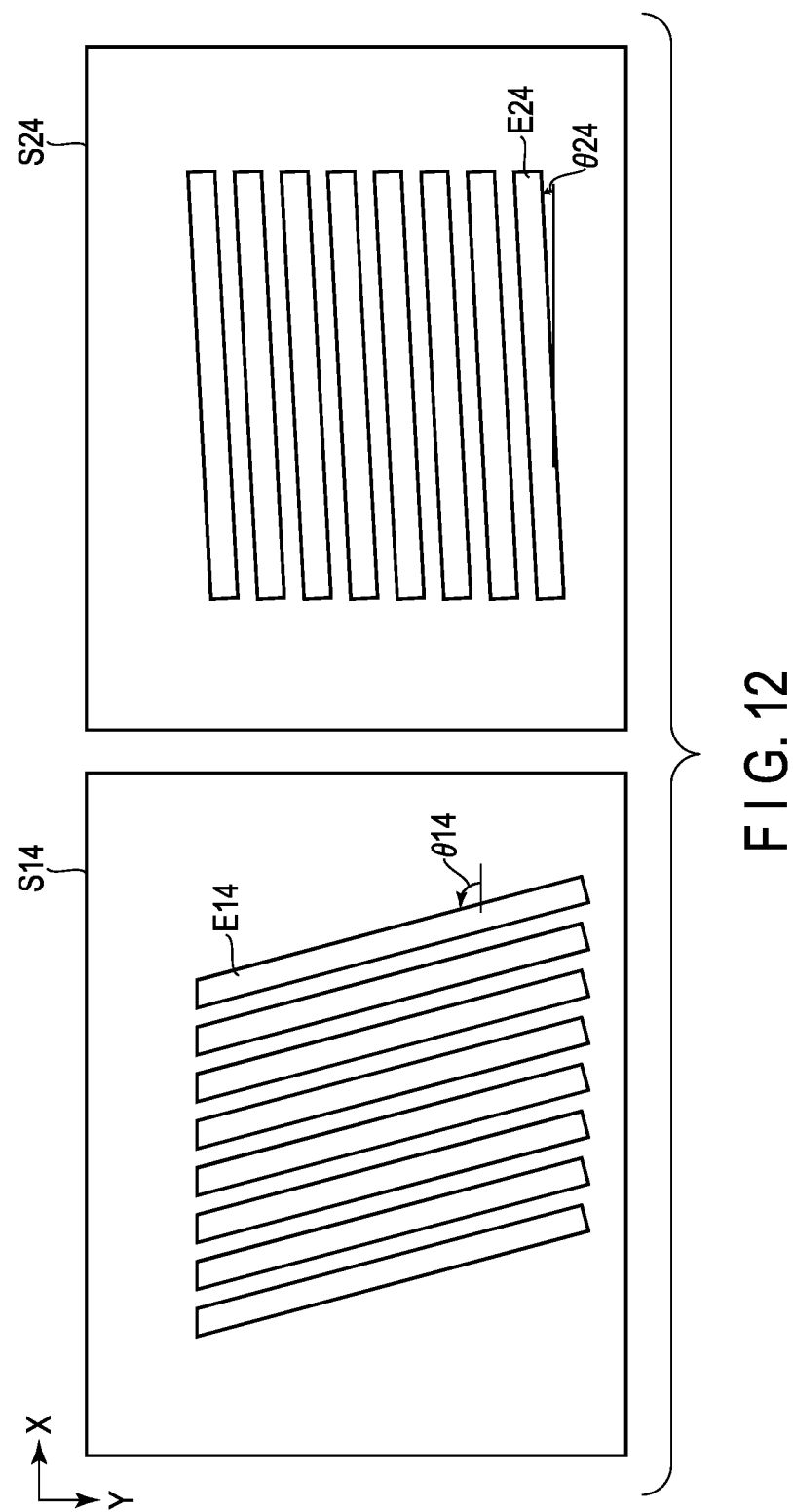

LIQUID CRYSTAL DEVICE

CROSS-REFERENCE TO RELATED APPLICATIONS

This application is based upon and claims the benefit of priority from Japanese Patent Application No. 2020-179556, filed Oct. 27, 2020, the entire contents of which are incorporated herein by reference.

FIELD

Embodiments described herein relate generally to a liquid crystal device.

BACKGROUND

Recently, a light control device using a liquid crystal cell has been proposed. Such a light control device mainly focuses or diverges a polarized light component. In one example, a liquid crystal lens comprising a plurality of ring strip electrodes has been proposed. In another example, a liquid crystal lens comprising transparent electrodes disposed in a plurality of divided areas spreading like a fan has been proposed.

BRIEF DESCRIPTION OF THE DRAWINGS

FIG. 1 is a perspective view showing a liquid crystal device 1 according to one embodiment.

FIG. 4 is a plan view showing a configuration example of a first substrate S11 shown in FIG. 3.

FIG. 5 is a plan view showing a configuration example of a second substrate S21 shown in FIG. 3.

FIG. 7 is an illustration schematically showing the first liquid crystal cell 10 in an off state (OFF) where no electric field is formed in a liquid crystal layer LC1.

FIG. 8 is an illustration schematically showing the first liquid crystal cell 10 in an on state (ON) where an electric field is formed in the liquid crystal layer LC1.

FIG. 12 is a plan view for explaining an example of the extension directions of first electrodes E14 and second electrodes E24 in the fourth liquid crystal cell 40.

DETAILED DESCRIPTION

Figure 2:
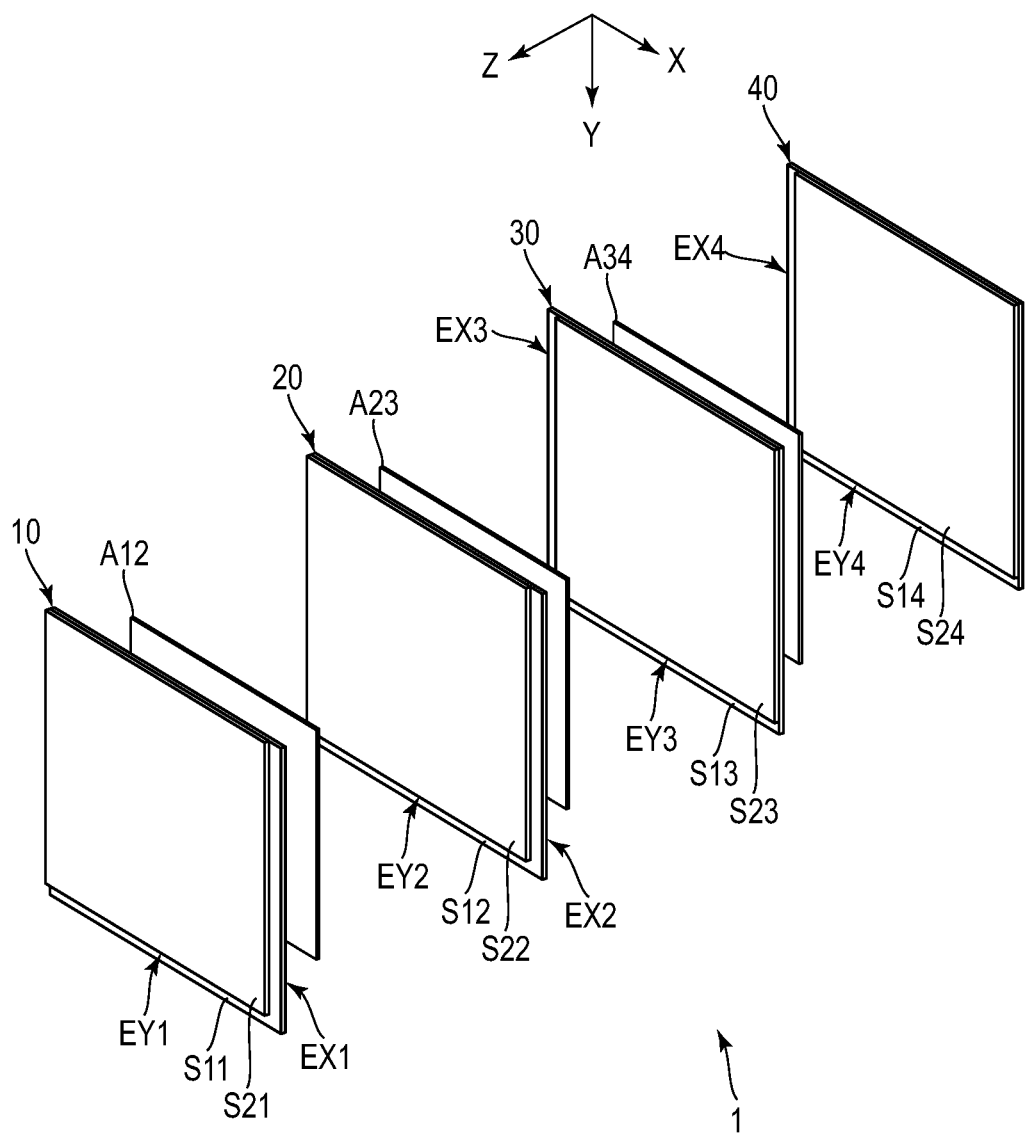
FIG. 2 is an exploded perspective view showing the liquid crystal device 1 shown in FIG. 1.

In general, according to one embodiment, there is provided a liquid crystal device comprising a first liquid crystal cell and a second liquid crystal cell bonded to the first liquid crystal cell. The first liquid crystal cell and the second liquid crystal cell each comprise a first substrate comprising a plurality of first electrodes formed in a strip shape, a second substrate comprising a plurality of second electrodes formed in a strip shape, and a liquid crystal layer held between the first substrate and the second substrate. An angle of intersection of the first electrodes and the second electrodes is less than 90° in each of the first liquid crystal cell and the second liquid crystal cell.

According to another embodiment, there is provided a liquid crystal device comprising a first liquid crystal cell, a second liquid crystal cell bonded to the first liquid crystal cell, a third liquid crystal cell bonded to the second liquid crystal cell, and a fourth liquid crystal cell bonded to the third liquid crystal cell. The first liquid crystal cell, the second liquid crystal cell, the third liquid crystal cell and the fourth liquid crystal cell each comprise a first substrate comprising a plurality of first electrodes formed in a strip shape, a second substrate comprising a plurality of second electrodes formed in a strip shape, and a liquid crystal layer held between the first substrate and the second substrate. An angle of intersection of the first electrodes and the second electrodes is less than 90° in each of the first liquid crystal cell, the second liquid crystal cell, the third liquid crystal cell and the fourth liquid crystal cell.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed descriptions thereof which are considered redundant are omitted where appropriate.

In the drawings, an X-axis, a Y-axis and a Z-axis which are orthogonal to each other are shown as needed for easier understanding. A direction along the X-axis is referred to as a first direction X, a direction along the Y-axis is referred to as a second direction Y, and a direction along the Z-axis is referred to as a third direction Z. A plane defined by the X-axis and the Y-axis is referred to as an X-Y plane, and viewing the X-Y plane is referred to as planar view.

FIG. 1 is a perspective view showing a liquid crystal device 1 according to the present embodiment.

The liquid crystal device 1 comprises a first liquid crystal cell 10, a second liquid crystal cell 20, a third liquid crystal cell 30, a fourth liquid crystal cell 40, a first flexible wiring board F1, a second flexible wiring board F2, a third flexible wiring board F3, a fourth flexible wiring board F4 and a circuit board 50. The liquid crystal device 1 according to the present embodiment comprises two or more liquid crystal cells, and is not limited to a configuration comprising four liquid crystal cells as in the example shown in FIG. 1.

The first liquid crystal cell 10, the second liquid crystal cell 20, the third liquid crystal cell 30 and the fourth liquid crystal cell 40 are stacked in this order in the third direction Z.

The first flexible wiring board F1 electrically connects the first liquid crystal cell 10 and the circuit board 50. The second flexible wiring board F2 electrically connects the second liquid crystal cell 20 and the circuit board 50. The third flexible wiring board F3 electrically connects the third liquid crystal cell 30 and the circuit board 50. The fourth flexible wiring board F4 electrically connects the fourth liquid crystal cell 40 and the circuit board 50.

The first flexible wiring board F1, the second flexible wiring board F2, the third flexible wiring board F3 and the fourth flexible wiring board F4 are bent along edges of the first liquid crystal cell 10, the second liquid crystal cell 20, the third liquid crystal cell 30 and the fourth liquid crystal cell 40, respectively, and are also bent along an edge 50E of the circuit board 50. The circuit board 50 is disposed to be opposed to the fourth liquid crystal cell 40 in the third direction Z.

An area for disposing a light source portion LS shown by a dotted line is secured between the circuit board 50 and the fourth liquid crystal cell 40. The light source portion LS comprises at least a light source, and comprises an optical element such as a lens between the light source and the fourth liquid crystal cell 40 as needed.

Light emitted from the light source portion LS is, for example, natural light. The light emitted from the light source portion LS is transmitted through the fourth liquid crystal cell 40, the third liquid crystal cell 30, the second liquid crystal cell 20 and the first liquid crystal cell 10 in order. As will be described later, the fourth liquid crystal cell 40, the third liquid crystal cell 30, the second liquid crystal cell 20 and the first liquid crystal cell 10 are configured to diffuse part of the polarized light components of incident light. As described above, it is possible to provide an illumination device capable of changing a light diffusion direction by combining the liquid crystal device 1 and the light source portion LS.

FIG. 2 is an exploded perspective view showing the liquid crystal device 1 shown in FIG. 1. In FIG. 2, the illustrations of the first flexible wiring board F1, the second flexible wiring board F2, the third flexible wiring board F3 and the fourth flexible wiring board F4 are omitted.

The first liquid crystal cell 10 comprises a first substrate S11 and a second substrate S21. The first substrate S11 has an extension portion EX1 which extends more outward than the second substrate S21 along the first direction X, and an extension portion EY1 which extends more outward than the second substrate S21 along the second direction Y.

The second liquid crystal cell 20 comprises a first substrate S12 and a second substrate S22. The first substrate S12 has an extension portion EX2 which extends more outward than the second substrate S22 along the first direction X, and an extension portion EY2 which extends more outward than the second substrate S22 along the second direction Y. The extension portion EX2 overlaps the extension portion EX1 and the extension portion EY2 overlaps the extension portion EY1 in the third direction Z.

The third liquid crystal cell 30 comprises a first substrate S13 and a second substrate S23. The first substrate S13 has an extension portion EX3 which extends more outward than the second substrate S23 along the first direction X, and an extension portion EY3 which extends more outward than the second substrate S23 along the second direction Y. The extension portion EY3 overlaps the extension portion EY2 in the third direction Z. The extension portion EX3 does not overlap the extension portion EX2 but is located on the opposite side to the extension portion EX2.

The fourth liquid crystal cell 40 comprises a first substrate S14 and a second substrate S24. The first substrate S14 has an extension portion EX4 which extends more outward than the second substrate S24 along the first direction X, and an extension portion EY4 which extends more outward than the second substrate S24 along the second direction Y. The extension portion EX4 overlaps the extension portion EX3 and the extension portion EY4 overlaps the extension portion EY3 in the third direction Z.

A transparent adhesive layer A12 is disposed between the first liquid crystal cell 10 and the second liquid crystal cell 20. The transparent adhesive layer A12 bonds the first substrate S11 of the first liquid crystal cell 10 and the second substrate S22 of the second liquid crystal cell 20.

A transparent adhesive layer S23 is disposed between the second liquid crystal cell 20 and the third liquid crystal cell 30. The transparent adhesive layer A23 bonds the first substrate S12 of the second liquid crystal cell 20 and the second substrate S23 of the third liquid crystal cell 30.

A transparent adhesive layer A34 is disposed between the third liquid crystal cell 30 and the fourth liquid crystal cell 40. The transparent adhesive layer A34 bonds the first substrate S13 of the third liquid crystal cell 30 and the second substrate S24 of the fourth liquid crystal cell 40.

Next, the first liquid crystal cell 10, the second liquid crystal cell 20, the third liquid crystal cell 30 and the fourth liquid crystal cell 40 will be described.

Figure 3:
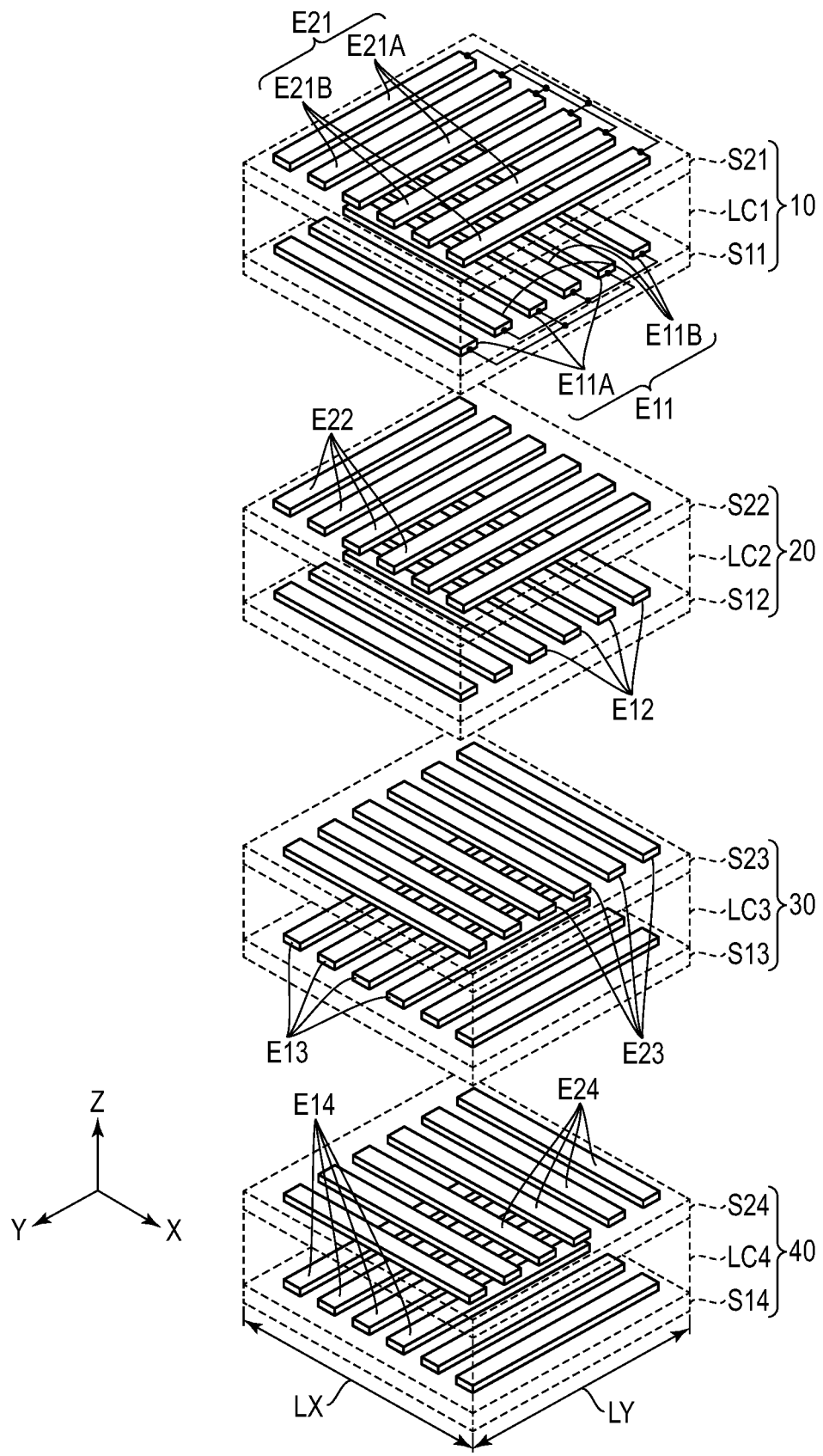
FIG. 3 is a perspective view showing a first liquid crystal cell 10, a second liquid crystal cell 20, a third liquid crystal cell 30 and a fourth liquid crystal cell 40.

FIG. 3 is a perspective view showing the first liquid crystal cell 10, the second liquid crystal cell 20, the third liquid crystal cell 30 and the fourth liquid crystal cell 40.

The first liquid crystal cell 10 comprises the first substrate S11, the second substrate S21 and a liquid crystal layer LC1. The liquid crystal layer LC1 is held between the first substrate S11 and the second substrate S21. The first substrate S11 comprises a plurality of first electrodes E11 formed in a strip shape. The first electrodes E11 extend along the first direction X, and are arranged at intervals along the second direction Y. The second substrate S21 comprises a plurality of second electrodes E21 formed in a strip shape. The second electrodes E21 extend along the second direction Y, and are arranged at intervals along the first direction X. That is, the first electrodes E11 and the second electrodes E21 intersect each other. As will be described later, the angle of intersection of the first electrodes E11 and the second electrodes E21 is less than 90° in planar view.

The second liquid crystal cell 20 comprises the first substrate S12 comprising a plurality of first electrodes E12, the second substrate S22 comprising a plurality of second electrodes E22, and a liquid crystal layer LC2. The liquid crystal layer LC2 is held between the first substrate S12 and the second substrate S22. The first electrodes E12 extend along the first direction X, and are arranged at intervals along the second direction Y. The second electrodes E22 extend along the second direction Y, and are arranged at intervals along the first direction X. The angle of intersection of the first electrodes E12 and the second electrodes E22 is less than 90° in planar view.

The third liquid crystal cell 30 comprises the first substrate S13 comprising a plurality of first electrodes E13, the second substrate S23 comprising a plurality of second electrodes E23, and a liquid crystal layer LC3. The liquid crystal layer LC3 is held between the first substrate S13 and the second substrate S23. The first electrodes E13 extend along the second direction Y, and are arranged at intervals along the first direction X. The second electrodes E23 extend along the first direction X, and are arranged at intervals along the second direction Y. The angle of intersection of the first electrodes E13 and the second electrodes E23 is less than 90° in planar view.

The fourth liquid crystal cell 40 comprises the first substrate S14 comprising a plurality of first electrodes E14, the second substrate S24 comprising a plurality of second electrodes E24, and a liquid crystal layer LC4. The liquid crystal layer LC4 is held between the first substrate S14 and the second substrate S24. The first electrodes E14 extend along the second direction Y, and are arranged at intervals along the first direction X. The second electrodes E24 extend along the first direction X, and are arranged at intervals along the second direction Y. The angle of intersection of the first electrodes E14 and the second electrodes E24 is less than 90° in planar view.

The first electrodes E11 of the first liquid crystal cell 10 and the first electrodes E14 of the fourth liquid crystal cell 40 are orthogonal to each other in planar view. The first electrodes E12 of the second liquid crystal cell 20 and the first electrodes E13 of the third liquid crystal cell 30 are orthogonal to each other in planar view. The first electrodes E11 of the first liquid crystal cell 10 and the first electrodes E12 of the second liquid crystal cell 20 intersect each other at an angle of less than 90° in planar view. The first electrodes E13 of the third liquid crystal cell 30 and the first electrodes E14 of the fourth liquid crystal cell 40 intersect each other at an angle of less than 90° in planar view.

The first substrate S11 of the first liquid crystal cell 10, the first substrate S12 of the second liquid crystal cell 20, the first substrate S13 of the third liquid crystal cell 30 and the first substrate S14 of the fourth liquid crystal cell 40 are formed in a square shape and have an equal size. That is, the first substrates S11 to S14 have an equal length LX along the first direction X and have an equal length LY along the second direction Y. In addition, the length LX is equal to the length LY (LX=LY).

Therefore, when the first liquid crystal cell 10, the second liquid crystal cell 20, the third liquid crystal cell 30 and the fourth liquid crystal cell 40 are bonded together, as shown in FIG. 1, edges thereof along the first direction X overlap each other, and edges thereof along the second direction Y overlap each other.

The first liquid crystal cell 10, the second liquid crystal cell 20, the third liquid crystal cell 30 and the fourth liquid crystal cell 40 have substantially the same configuration, but the first liquid crystal cell 10 will be described more specifically below as a typical example.

The first electrodes E11 include a plurality of first strip electrodes E11A and a plurality of second strip electrodes 11B. The first strip electrodes E11A are electrically connected to each other, and are configured to be subjected to the same voltage (first voltage). The second strip electrodes E11B are electrically connected to each other, and are configured to be subjected to the same voltage (second voltage). The voltage applied to the second strip electrodes E11B is controlled to be different from the voltage applied to the first strip electrodes E11A. These first strip electrodes E11A and second strip electrodes E11B are alternately arranged along the second direction Y.

The second electrodes E21 include a plurality of third strip electrodes E21A and a plurality of fourth strip electrodes E21B. The third strip electrodes E21A are electrically connected to each other, and are configured to be subjected to the same voltage (third voltage). The fourth strip electrodes E21B are electrically connected to each other, and are configured to be subjected to the same voltage (fourth voltage). The voltage applied to the fourth strip electrodes E21B is controlled to be different from the voltage applied to the third strip electrodes E21A. These third strip electrodes E21A and fourth strip electrodes E21B are alternately arranged along the first direction X.

FIG. 4 is a plan view showing a configuration example of the first substrate S11 shown in FIG. 3. It should be noted that, although the first substrates S12 to S14 shown in FIG. 3 have the same configuration as the first substrate S11 shown in FIG. 4, the extension directions of the first electrodes thereof will be described later.

The first substrate S11 comprises the first electrodes E11 including the first strip electrodes E11A and the second strip electrodes E11B, and a plurality of power supply lines PL11 to PL14. The first strip electrodes E11A are electrically connected to the power supply line PL12. The second strip electrodes E11B are electrically connected to the power supply line PL13.

The power supply line PL11 has a power supply terminal PT11 located on one end side and a connection terminal T11 located on the other end side. The power supply line PL14 has a power supply terminal PT14 located on one end side and a connection terminal T14 located on the other end side. Between the connection terminal T11 and the connection terminal T14, the power supply line PL12 has a connection terminal T12, and the power supply line PL13 has a connection terminal T13. These connection terminals T11 to T14 constitute a connection portion connected to the first flexible board F1 shown in FIG. 1.

FIG. 5 is a plan view showing a configuration example of the second substrate S21 shown in FIG. 3. It should be noted that, although the second substrates S22 to S24 shown in FIG. 3 have the same configuration as the second substrate S21 shown in FIG. 5, the extension directions of the second electrodes thereof will be described later.

The second substrate S21 comprises the second electrodes E21 including the third strip electrodes E21A and the fourth strip electrodes E21B, and a plurality of power supply lines PL21 and PL24. The third strip electrodes E21A are electrically connected to the power supply line PL21. The fourth strip electrodes E21B are electrically connected to the power supply line PL24.

The power supply line PL21 has a power supply terminal PT21 located on one end side. The power supply line PL24 has a power supply terminal PT24 located on one end side. When the second substrate S21 shown in FIG. 5 is disposed to be opposed to the first substrate S11 shown in FIG. 4, the power supply terminal PT21 is opposed to the power supply terminal Pl11 of the first substrate S11, and the power supply terminal PT24 is opposed to the power supply terminal PT14 of the first substrate S11.

Figure 6:
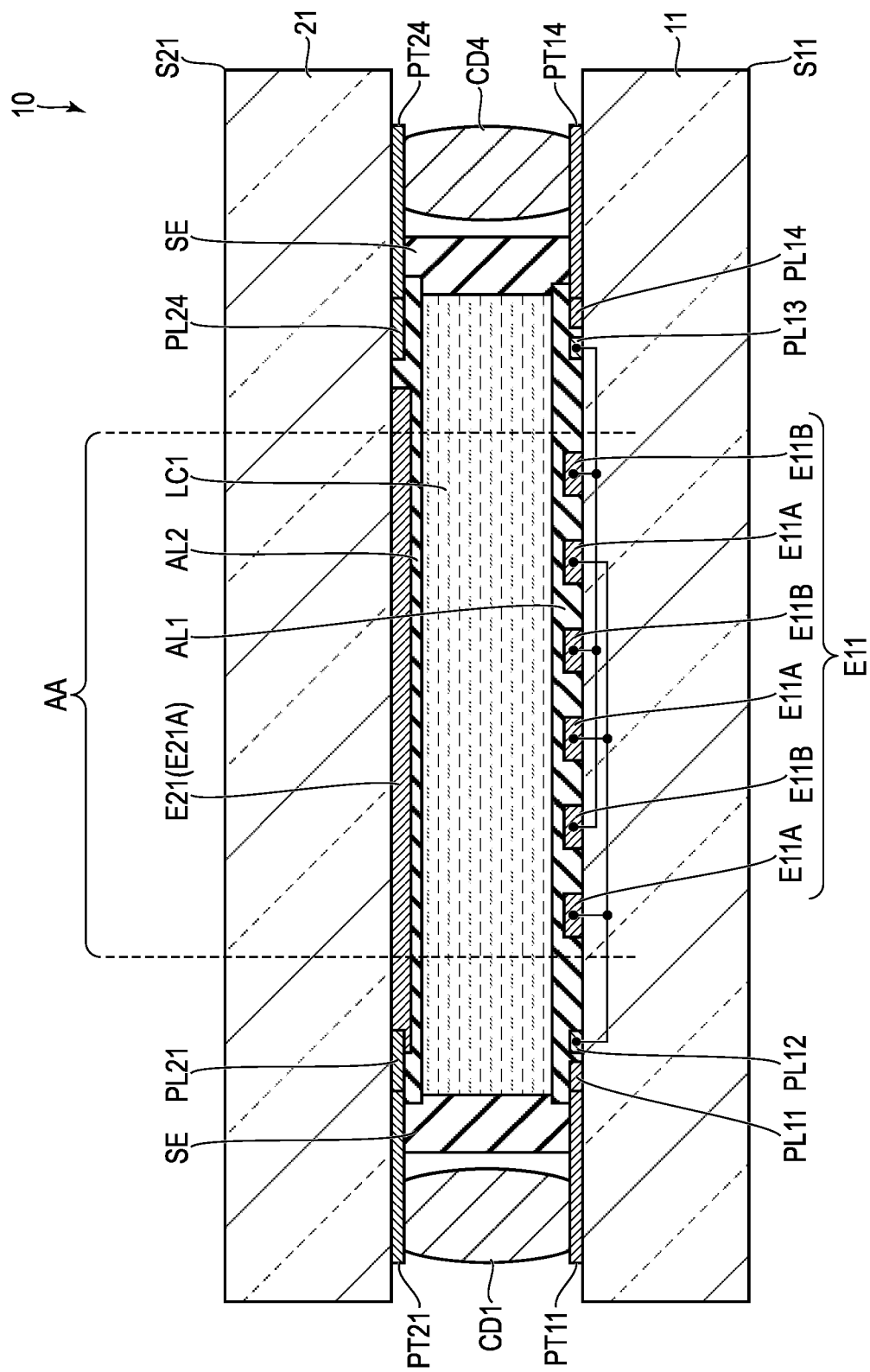
FIG. 6 is a cross-sectional view showing a configuration example of the first liquid crystal cell 10.

FIG. 6 is a cross-sectional view showing a configuration example of the first liquid crystal cell 10. Although the first liquid crystal cell 10 is described here, the second liquid crystal cell 20, the third liquid crystal cell 30 and the fourth liquid crystal cell 40 have the same cross-sectional structure, and descriptions thereof are omitted.

The first liquid crystal cell 10 has an effective area AA which can scatter incident light. The first substrate S11 and the second substrate S21 are bonded together by a sealant SE outside the effective area AA. The liquid crystal layer LC1 is sealed by the sealant SE.

The first substrate S11 comprises an insulating substrate 11 and an alignment film AL1 in addition to the first electrodes E11 and the power supply lines PL11 to PL14. The first electrodes E11 and the power supply lines PL11 to PL14 are disposed on the insulating substrate 11 and are covered with the alignment film AL1.

The power supply terminal PT11 integrated with the power supply line PL11 is drawn to the outside of the sealant SE. The power supply terminal PT14 integrated with the power supply line PL14 is drawn to the outside of the sealant SE. The power supply terminals PT11 and PT14 are exposed from the alignment film AL1.

The second substrate S21 comprises an insulating substrate 21 and an alignment film AL2 in addition to the second electrodes E21 and the power supply lines PL21 and PL24. The second electrodes E21 and the power supply lines PL21 and PL24 are disposed on the insulating substrate 21, and are covered with the alignment film AL2. Although only one second electrode E21 orthogonal to the first electrodes E11 is illustrated here, as described with reference to FIG. 5, the second substrate S21 comprises the second electrodes E21 including the third strip electrodes E21A and the fourth strip electrodes E21B between the insulating substrate 21 and the alignment film AL2.

The power supply terminal PT21 integrated with the power supply line PL21 is drawn to the outside of the sealant SE. The power supply terminal PT21 is located directly above the power supply terminal PT11. The power supply terminal PT24 integrated with the power supply line PL24 is drawn to the outside of the sealant SE. The power supply terminal PT24 is located directly above the power supply terminal PT14. The power supply terminals PT21 and PT24 are exposed from the alignment film AL2.

A conductive material CD1 is disposed between the power supply terminal PT11 and the power supply terminal PT21, and electrically connects these two. A conductive material CD2 is disposed between the power supply terminal PT14 and the power supply terminal PT24, and electrically connects these two.

The insulating substrates 11 and 21 are, for example, transparent substrates such as glass substrates or resin substrates. The first electrodes E11 and the second electrodes E21 are transparent electrodes formed of a transparent conductive material such as indium tin oxide (ITO) or indium zinc oxide (IZO). The power supply lines PL11 to PL14 and the power supply lines PL21 and PL24 are formed of a metal material such as aluminum, titanium, molybdenum or tungsten. It should be noted that the power supply lines PL11 to PL14 and the power supply lines PL21 and PL24 may be formed of the same material as the transparent electrode. The alignment films AL1 and AL2 are horizontal alignment films having an alignment regulating force substantially parallel to the X-Y plane.

Next, an optical effect in the first liquid crystal cell 10 will be described with reference to FIGS. 7 and 8. Only the configuration necessary for explanation is illustrated in FIGS. 7 and 8.

FIG. 7 is an illustration schematically showing the first liquid crystal cell 10 in an off state (OFF) where no electric field is formed in the liquid crystal layer LC1.

In the liquid crystal layer LC1 in the off state, liquid crystal molecules LM1 are in an initial alignment state. In this off state, the liquid crystal layer LC1 has substantially uniform refractive index distribution. Therefore, a first polarized light component POL1 which is incident light to the first liquid crystal cell 10 is transmitted through the liquid crystal layer LC1 almost without being refracted (or scattered). The first polarized light component POL1 here corresponds to, for example, p-polarized light of natural light. In the present specification, s-polarized light orthogonal to p-polarized light may be referred to as a second polarized light component POL2.

FIG. 8 is an illustration schematically showing the first liquid crystal cell 10 in an on state (ON) where an electric field is formed in the liquid crystal layer LC1.

For example, when the liquid crystal layer LC1 has a positive dielectric anisotropy, in the on state where an electric field is formed in the liquid crystal layer LC1, the liquid crystal molecules LM1 are aligned such that major axes thereof are along the electric field. Therefore, as shown in FIG. 8, an area where the liquid crystal molecules LM1 are maintained in the initial alignment state, an area where the liquid crystal molecules LM1 stand substantially vertically to the substrate, an area where the liquid crystal molecules LM1 stand obliquely to the substrate, and the like are formed in the liquid crystal layer LC1.

The liquid crystal molecules LM1 have a refractive index anisotropy Δn. Therefore, the liquid crystal layer LC1 in the on state has refractive index distribution or retardation distribution according to the alignment state of the liquid crystal molecules LM1. The retardation here is represented as Δn·d where d is the thickness of the liquid crystal layer LC1.

In this on state, when the first polarized light component POL1 is transmitted through the liquid crystal layer LC1, the first polarized light component POL1 is scattered by the effect of the refractive index distribution of the liquid crystal layer LC1.

In a configuration where the first liquid crystal cell 10, the second liquid crystal cell 20, the third liquid crystal cell 30 and the fourth liquid crystal cell 40 are stacked, for example, the first liquid crystal cell 10 and the fourth liquid crystal cell 40 mainly scatter the first polarized light component (p-polarized light) POL1 of natural light, and the second liquid crystal cell 20 and the third liquid crystal cell 30 mainly scatter the second polarized light component (s-polarized light) POL2 of natural light.

Incidentally, if white light enters a liquid crystal layer where refractive index distribution is formed, the degree of scattering varies according to wavelength. Therefore, a part of scattered white light may be colored.

In the present embodiment, the refractive index distribution formed in the liquid crystal layer LC1 of the first liquid crystal cell 10 and the refractive index distribution formed in the liquid crystal layer LC4 of the fourth liquid crystal cell 40 are therefore configured to be different from each other. Accordingly, the degree of scattering of the first polarized light component POL1 in the first liquid crystal cell 10 and the degree of scattering of the first polarized light component POL1 in the fourth liquid crystal cell 40 are different from each other, and the coloring of the first polarized light component POL1 is suppressed.

Similarly, the refractive index distribution formed in the liquid crystal layer LC2 of the second liquid crystal cell 20 and the refractive index distribution formed in the liquid crystal layer LC3 of the third liquid crystal cell 30 are configured to be different from each other. Accordingly, the degree of scattering of the second polarized light component POL2 in the second liquid crystal cell 20 and the degree of scattering of the second polarized light component POL2 in the third liquid crystal cell 30 are different from each other, and the coloring of the second polarized light component POL2 is suppressed.

Next, the extension direction of the first electrodes and the extension direction of the second electrodes in each of the first liquid crystal cell 10, the second liquid crystal cell 20, the third liquid crystal cell 30 and the fourth liquid crystal cell 40 will be described. In the following description, a common reference direction is set. The reference direction here may be any direction in the X-Y plane, but is, for example, a direction parallel to the first direction X. In addition, all angles with respect to the reference direction are angles in the counterclockwise direction in the X-Y plane.

Figure 9:
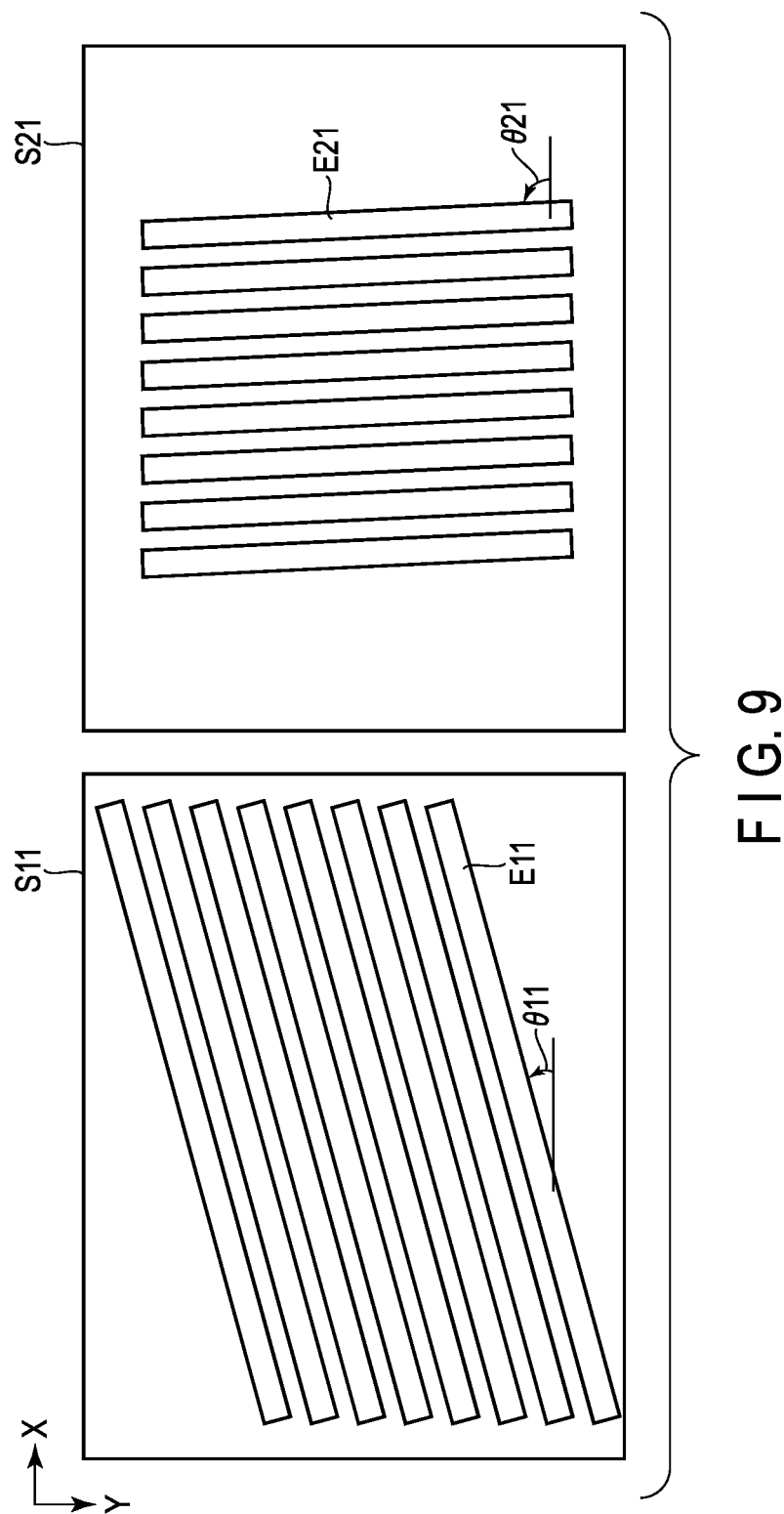
FIG. 9 is a plan view for explaining an example of the extension directions of first electrodes E11 and second electrodes E21 in the first liquid crystal cell 10.

FIG. 9 is a plan view for explaining an example of the extension directions of the first electrodes E11 and the second electrodes E21 in the first liquid crystal cell 10.

An angle θ11 between the reference direction and the extension direction of the first electrodes E11 is an acute angle, and an angle θ21 between the reference direction and the extension direction of the second electrodes E21 is an obtuse angle. When the first substrate S11 and the second substrate S21 are disposed to be opposed to each other, the first electrodes E11 and the second electrodes E21 are not orthogonal to each other in planar view. That is, the angle of intersection of the first electrodes E11 and the second electrodes E21 is less than 90°.

In one example, the angle θ11 is 3°, and the angle θ21 is 91°. That is, the angle of intersection of the first electrodes E11 and the second electrodes E21 is 88°.

Figure 10:
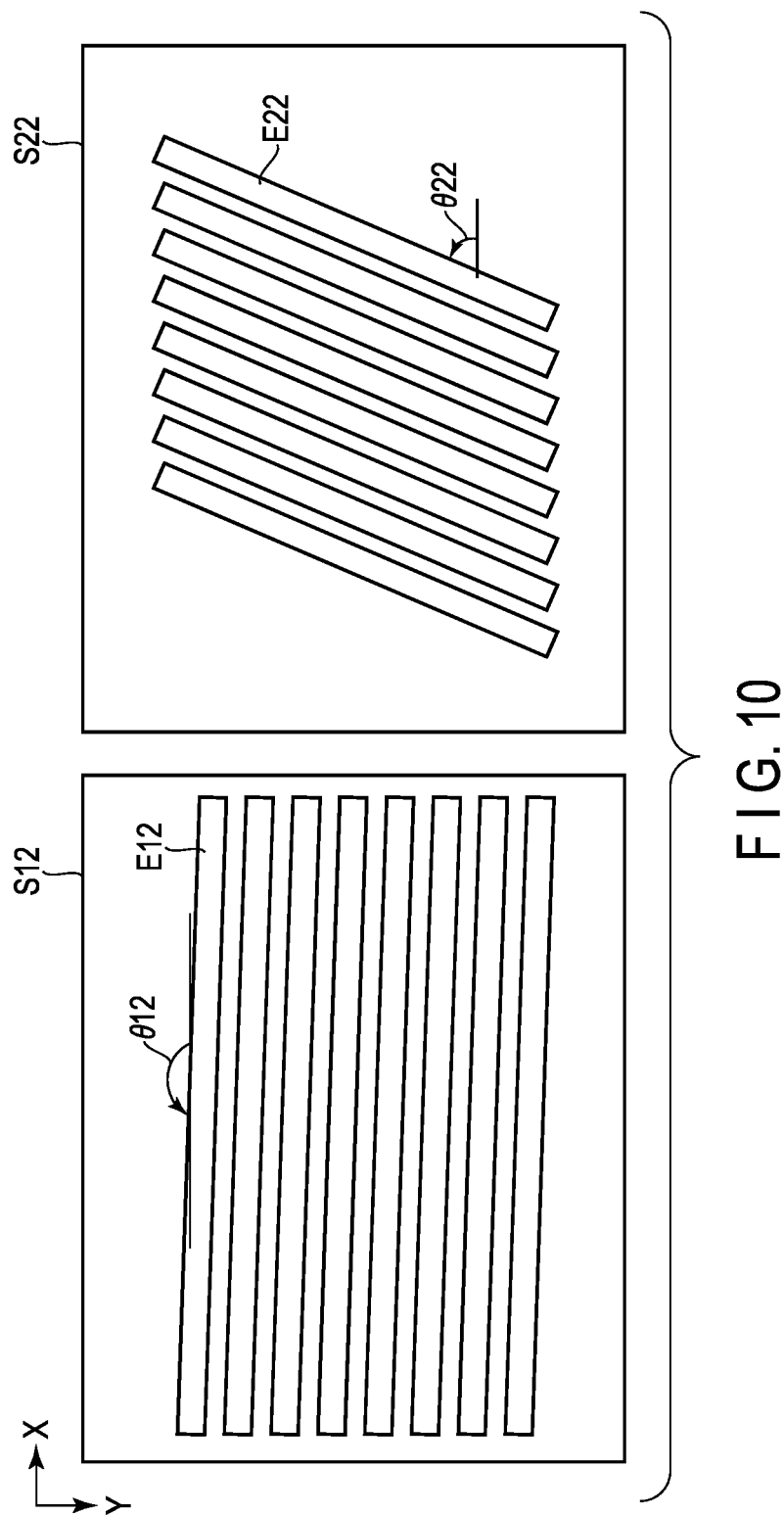
FIG. 10 is a plan view for explaining an example of the extension directions of first electrodes E12 and second electrodes E22 in the second liquid crystal cell 20.

FIG. 10 is a plan view for explaining an example of the extension directions of the first electrodes E11 and the second electrodes E22 in the second liquid crystal cell 20.

An angle θ12 between the reference direction and the extension direction of the first electrodes E12 is an obtuse angle, and an angle θ22 between the reference direction and the extension direction of the second electrodes E22 is an acute angle. That is, the angle θ12 is different from the angle θ11 shown in FIG. 9, and the angle θ22 is different from the angle θ21 shown in FIG. 9. When the first substrate S12 and the second substrate S22 are disposed to be opposed to each other, the first electrodes E11 and the second electrodes E22 are not orthogonal to each other in planar view. That is, the angle of intersection of the first electrodes E12 and the second electrodes E22 is less than 90°.

In one example, the angle θ12 is 179°, and the angle θ22 is 87°. That is, the angle of intersection of the first electrodes E12 and the second electrodes E22 is 88°. As described above, the angle of intersection of the first electrodes E12 and the second electrodes E22 is equal to the angle of intersection of the first electrodes E11 and the second electrodes E21 shown in FIG. 9.

In addition, the first electrodes E11 in the first liquid crystal cell 10 and the first electrodes E12 in the second liquid crystal cell 20 are non-parallel to each other, and intersect each other at an angle of less than 90°. In one example, the angle of intersection of the first electrodes E11 and the first electrodes E12 is 4°.

Furthermore, the second electrodes E21 and the second electrodes E22 are non-parallel to each other, and intersect each other at an angle of less than 90°. In one example, the angle of intersection of the second electrodes E21 and the second electrodes E22 is 4°.

In short, when the first liquid crystal cell 10 and the second liquid crystal cell 20 are bonded together, the extension directions of the first electrodes E11, the second electrodes E21, the first electrodes E12 and the second electrodes E22 do not match each other (that is, non-parallel to each other). Since there are no perfectly overlapping electrodes as described above, moire can be suppressed. From the perspective of suppressing moire, the angle of intersection of the first electrodes and the second electrodes is preferably less than or equal to 88°.

Figure 11:
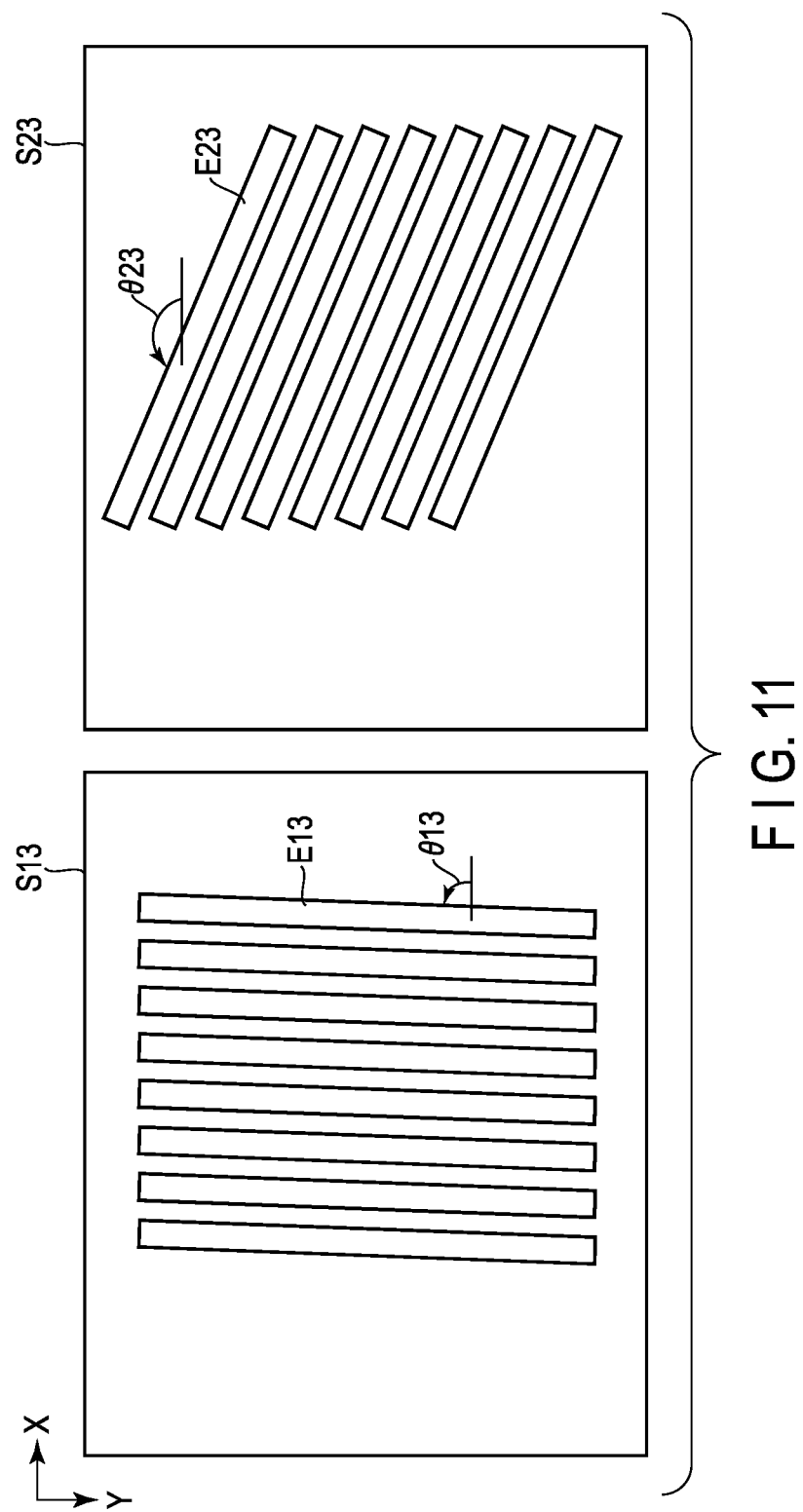
FIG. 11 is a plan view for explaining an example of the extension directions of first electrodes E13 and second electrodes E23 in the third liquid crystal cell 30.

FIG. 11 is a plan view for explaining an example of the extension directions of the first electrodes E13 and the second electrodes E23 in the third liquid crystal cell 30.

An angle θ13 between the reference direction and the extension direction of the first electrodes E13 is an acute angle, and an angle θ23 between the reference direction and the extension direction of the second electrodes E23 is an obtuse angle. That is, the angle θ13 is different from the above angles θ11 and θ12, and the angle θ23 is different from the above angles θ21 and θ22. When the first substrate S13 and the second substrate S23 are disposed to be opposed to each other, the first electrodes E13 and the second electrodes E23 are not orthogonal to each other in planar view. That is, the angle of intersection of the first electrodes E13 and the second electrodes E23 is less than 90°, and is preferably less than or equal to 88°.

In one example, the angle θ13 is 89°, and the angle θ23 is 177°. That is, the angle of intersection of the first electrodes E13 and the second electrodes E23 is 88°. As described above, the angle of intersection of the first electrodes E13 and the second electrodes E23 is equal to the angle of intersection of the first electrodes E11 and the second electrodes E21 shown in FIG. 9.

In addition, the extension direction of the first electrodes E13 is orthogonal to the extension direction of the first electrodes E12 shown in FIG. 10. That is, when the first substrate S12 shown in FIG. 10 is rotated 90 degrees clockwise in the X-Y plane, the extension direction of the first electrodes E12 matches the extension direction of the first electrodes E13. Similarly, the extension direction of the second electrodes E23 is orthogonal to the extension direction of the second electrodes E22 shown in FIG. 10. That is, when the second substrate S22 shown in FIG. 10 is rotated 90 degrees clockwise in the X-Y plane, the extension direction of the second electrodes E22 matches the extension direction of the second electrodes E23.

In short, the second liquid crystal cell 20 and the third liquid crystal cell 30 are 90 degrees rotationally symmetrical, and the second liquid crystal cell 20 can be used as the third liquid crystal cell 30 when rotated 90 degrees clockwise in the X-Y plane. Therefore, the cost can be reduced as compared with when the second liquid crystal cell 20 and the third liquid crystal cell 30 are prepared separately.

In addition, also when the first liquid crystal cell 10, the second liquid crystal cell 20 and the third liquid crystal cell 30 are bonded together, there are no perfectly overlapping electrodes, and therefore moire can be suppressed.

FIG. 12 is a plan view for explaining an example of the extension directions of the first electrodes E14 and the second electrodes E24 in the fourth liquid crystal cell 40.

An angle θ14 between the reference direction and the extension direction of the first electrodes E14 is an obtuse angle, and an angle θ24 between the reference direction and the extension direction of the second electrodes E24 is an acute angle. That is, the angle θ14 is different from the above angles θ11 to θ13, and the angle θ24 is different from the above angles θ21 to θ23. When the first substrate S14 and the second substrate S24 are disposed to be opposed to each other, the first electrodes E14 and the second electrodes E24 are not orthogonal to each other in planar view. That is, the angle of intersection of the first electrodes E14 and the second electrodes E24 is less than 90°, and is preferably less than or equal to 88°.

In short, in each of the first liquid crystal cell 10, the second liquid crystal cell 20, the third liquid crystal cell 30 and the fourth liquid crystal cell 40, the angle of intersection of the first electrodes and the second electrodes is less than 90°, is equal, and is less than or equal to 88°.

In one example, the angle θ14 is 93°, and the angle θ24 is 1°. That is, the angle of intersection of the first electrodes E14 and the second electrodes E24 is 88°. As described above, the angle of intersection of the first electrodes E14 and the second electrodes E24 is equal to the angle of intersection of the first electrodes E11 and the second electrodes E21 shown in FIG. 9.

In addition, the first electrodes E13 in the third liquid crystal cell 30 and the first electrodes E14 in the fourth liquid crystal cell 40 are non-parallel to each other, and intersect each other at an angle of less than 90°. In one example, the angle of intersection of the first electrodes E13 and the first electrodes E14 is 4°.

Furthermore, the second electrodes E23 and the second electrodes E24 are non-parallel to each other, and intersect each other at an angle of less than 90°. In one example, the angle of intersection of the second electrodes E23 and the second electrodes E24 is 4°.

Furthermore, the extension direction of the first electrodes E14 is orthogonal to the extension direction of the first electrodes E11 shown in FIG. 9. That is, when the first substrate S11 shown in FIG. 9 is rotated 90 degrees clockwise in the X-Y plane, the extension direction of the first electrodes E11 matches the extension direction of the first electrodes E14. Similarly, the extension direction of the second electrodes E24 is orthogonal to the extension direction of the second electrodes E21 shown in FIG. 9. That is, when the second substrate S21 shown in FIG. 9 is rotated 90 degrees clockwise in the X-Y plane, the extension direction of the second electrodes E21 matches the extension direction of the second electrodes E24.

In short, the first liquid crystal cell 10 and the fourth liquid crystal cell 40 are 90 degrees rotationally symmetrical, and the first liquid crystal cell 10 can be used as the fourth liquid crystal cell 40 when rotated 90 degrees clockwise in the X-Y plane Therefore, the cost can be reduced as compared with when the first liquid crystal cell 10 and the fourth liquid crystal cell 40 are prepared separately.

In addition, also when the first liquid crystal cell 10, the second liquid crystal cell 20, the third liquid crystal cell 30 and the fourth liquid crystal cell 40 are bonded together, there are no perfectly overlapping electrodes, and therefore moire can be suppressed.

As described above, according to the present embodiment, a liquid crystal device capable of suppressing moire can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:
1. A liquid crystal device comprising:
a first liquid crystal cell;
a second liquid crystal cell bonded to the first liquid crystal cell;
a third liquid crystal cell bonded to the second liquid crystal cell; and
a fourth liquid crystal cell bonded to the third liquid crystal cell, wherein
the first liquid crystal cell, the second liquid crystal cell, the third liquid crystal cell and the fourth liquid crystal cell each comprise:
a first substrate comprising a plurality of first electrodes formed in a strip shape;
a second substrate comprising a plurality of second electrodes formed in a strip shape; and
a liquid crystal layer held between the first substrate and the second substrate,
an angle of intersection of the first electrodes and the second electrodes is less than 90° in each of the first liquid crystal cell, the second liquid crystal cell, the third liquid crystal cell and the fourth liquid crystal cell,
the angle of intersection of the first electrodes and the second electrodes is equal in each of the first liquid crystal cell, the second liquid crystal cell, the third liquid crystal cell and the fourth liquid crystal cell,
the angle of intersection is less than or equal to 88°,
the first electrodes of the first liquid crystal cell and the first electrodes of the fourth liquid crystal cell are orthogonal to each other,
the first electrodes of the second liquid crystal cell and the first electrodes of the third liquid crystal cell are orthogonal to each other, and
the first electrodes of the first liquid crystal cell and the first electrodes of the second liquid crystal cell intersect each other at an angle of less than 90°.

2. The liquid crystal device of claim 1, wherein the first substrate is formed in a square shape and has an equal size in each of the first liquid crystal cell, the second liquid crystal cell, the third liquid crystal cell and the fourth liquid crystal cell.

3. The liquid crystal device of claim 2, wherein
the first electrodes include a plurality of first strip electrodes configured to apply a same first voltage and a plurality of second strip electrodes configured to apply a same second voltage, the first voltage is different from the second voltage, and the first strip electrodes and the second strip electrodes are alternately arranged, and
the second electrodes include a plurality of third strip electrodes configured to apply a same third voltage and a plurality of fourth strip electrodes configured to apply a same fourth voltage, the third voltage is different from the fourth voltage, and the third strip electrodes and the fourth strip electrodes are alternately arranged.

* * * * *